United States Patent [19]
Mrugala

[11] 3,774,632
[45] Nov. 27, 1973

[54] SANITARY VALVE
[75] Inventor: Ronald J. Mrugala, Brooklyn Park, Minn.
[73] Assignee: The Cornelius Company, Anaka, Minn.
[22] Filed: June 28, 1971
[21] Appl. No.: 157,097

[52] U.S. Cl.............. 137/315, 137/322, 137/333, 137/385, 251/155, 251/260, 251/291, 251/367
[51] Int. Cl............. F16k 35/10, F16k 43/00
[58] Field of Search.......... 137/315, 322, 333, 137/383, 384, 385, 801, 269, 271; 251/153, 251/214, 259, 260, 291, 318, 347, 367, 251/143, 155, 144

[56] References Cited
UNITED STATES PATENTS

| | | | |
|---|---|---|---|
| 1,633,642 | 6/1927 | Kramer | 137/322 |
| 2,567,426 | 9/1951 | Ferrari | 251/155 |
| 1,552,094 | 9/1925 | Thomsen | 251/260 |
| 2,008,375 | 7/1935 | Wheaton | 251/291 X |
| 2,295,445 | 9/1942 | Anschicks | 137/383 X |
| 2,563,244 | 8/1951 | Holicer | 251/259 X |
| 2,874,996 | 2/1959 | Zajac | 251/291 X |
| 3,494,373 | 2/1970 | Horak et al. | 137/322 X |

FOREIGN PATENTS OR APPLICATIONS
78,982  9/1918  Switzerland........... 251/260

Primary Examiner—Martin P. Schwadron
Assistant Examiner—David R. Matthews
Attorney—Carlton Hill et al.

[57] ABSTRACT

A dispensing system includes a valve element biased by fluid pressure against a valve seat, and a valve body having a dispensing outlet and a valve actuator which are manually detachable from that part of the system or sanitary valve which contains the valve seat without unseating of the valve. The valve has a stem which projects through the seat into the valve body, and a substitute valve body, provided with a keyed lock, prevents unauthorized unseating of the valve when the valve body is detached.

5 Claims, 7 Drawing Figures

PATENTED NOV 27 1973 3,774,632

INVENTOR.
Ronald J. Mrugala
BY ATTORNEYS

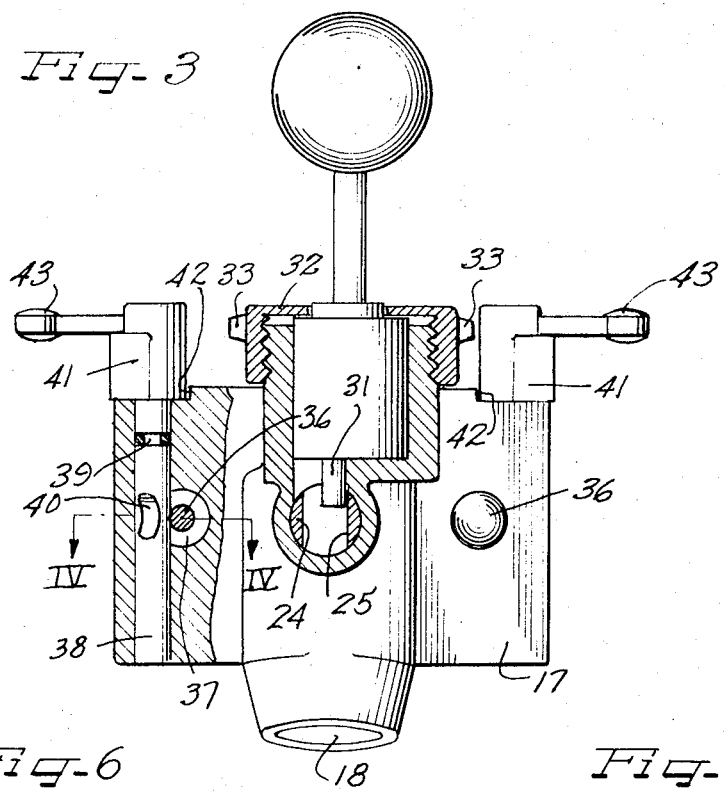
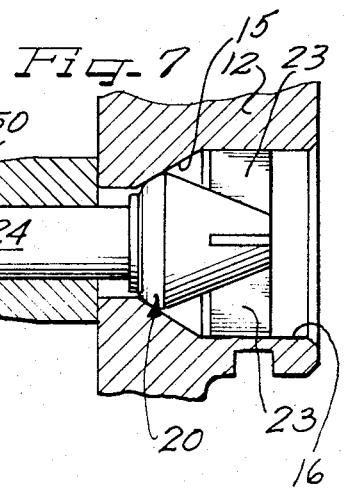
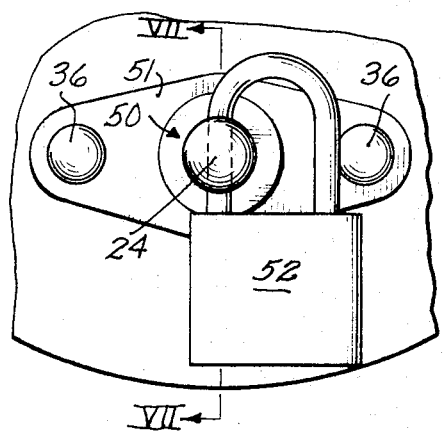
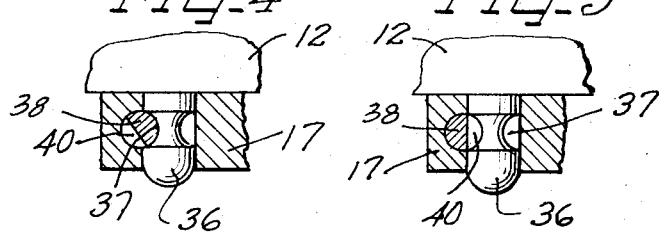

SANITARY VALVE

BACKGROUND OF THE INVENTION

1. Field of the Invention

This invention relates to a beverage dispensing system of the pressurized type, and more specifically to a sanitary valve embodied therein.

2. Prior Art

Where equipment is provided for the dispensing of a product for human consumption, sanitation of such equipment is of prime concern. This is particularly true in the case of dairy products which normally contain bacteria and thus tend to spoil of themselves. Examples include soft serve ice cream, soft serve ice milk, malted milk and the like. Included also are other semi-frozen products such as of the slush type. When a non-pressurized system is used, the product that is to be dispensed is normally stored under atmospheric pressure, a condition that enables room air with its bacteria to come in contact with the product. Where equipment of this type is utilized, it is the present practice that the equipment must be drained and cleaned at the close of business every day. This procedure is expensive, is time consuming, and is apt to cause waste of unsold product or loss of sales if the operator is unwilling to load the machine with additional product near the end of the day, as well as loss of sales during the time that the machine is being cleaned. Further, a start-up time is needed along with attendant labor.

SUMMARY OF THE INVENTION

In accordance with this invention, the product is maintained under pressure derived from an inert source of food-grade gas. As atmospheric bacteria cannot reach the stored product, the need for daily drainage and cleaning is eliminated. However, the dispensing valve is still subject to atmospheric conditions downstream of the valve seat. Therefore, as a further feature of this invention, the valve body that contains the dispensing outlet and that supports the valve actuator are detachable from the valve seat and are reattachable thereto without any unseating of the valve. Therefore, those parts of the valve that need daily cleaning can be manually detached and sanitized, without the aid of tools, and such detachment and reattachment takes only a matter of seconds to accomplish. According to a further feature of the invention, a substitute valve body is provided that enables the valve element to be locked, as by a keyed lock, to render impossible the unauthorized unseating of the valve. Thus unauthorized dispensing can be prevented even though there be no need for sanitizing.

Accordingly, it is an object of the present invention to provide a product dispensing system having a sanitary dispensing valve.

Another object of the present invention is to provide a dispensing valve so constructed that its body and a valve actuator can be removed without there being any unseating of the valve element that remains connected in the dispensing system.

A further object of the present invention is to provide a valve construction such that it can be readily locked to prevent unauthorized dispensing.

A still further object of the present invention is to provide a sanitary valve construction that can be disassembled for sanitizing without the use of any tools.

Many other advantages, features and additional objects of the present invention will become manifest to those versed in the art upon making reference to the detailed description and the accompanying drawings in which a preferred structural embodiment incorporating the principles of the present invention is shown by way of illustrative example.

ON THE DRAWING

FIG. 3 is a front elevational view, a portion thereof being shown in cross section, taken along III—III of FIG. 1;

FIG. 4 is a fragmentary enlarged cross-sectional view taken along line IV—IV of FIG. 3;

FIG. 5 is a cross-sectional view corresponding to FIG. 4 with a locking pin disposed in an unlocked position;

FIG. 6 is a front elevational view thereof with the regular valve body and actuator removed and a substitute valve body and lock attached; and FIG. 7 is a side cross-sectional view taken along line VII—VII of FIG. 6.

AS SHOWN ON THE DRAWINGS

Figure 1:
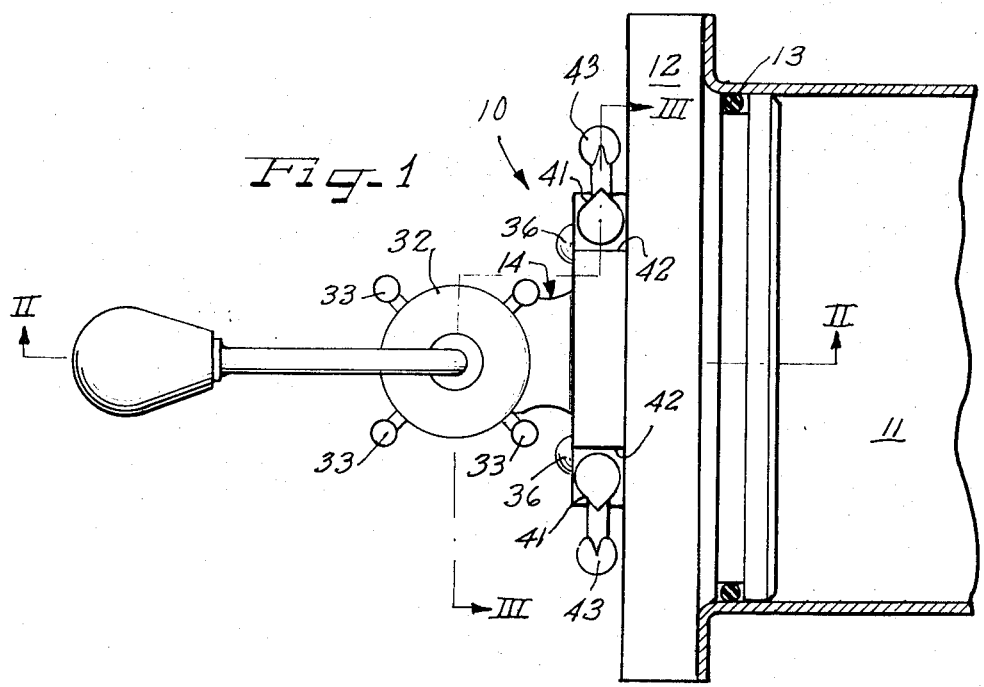
FIG. 1 is a fragmentary top view of a product dispensing system for dispensing a pressurized product, material or beverage, the system being provided with a sanitary dispensing valve, all in accordance with the principles of the present invention.

The principles of the present invention are particularly useful when embodied in a product dispensing system such as shown fragmentarily in FIG. 1, generally indicated by the numeral 10. The product or material to be dispensed typically is semi-frozen, such as ice cream, ice milk, malted milk, or a slush beverage, and is maintained under pressure by means of a source of pressurized gas (not shown). The system thus includes a source of pressurized product 11, here represented as an end of a freezing chamber which is closed by a conventional end plate 12 which has a seal 13 for maintaining a leak-free condition. The system 10 includes a sanitary dispensing valve generally indicated at 14 and best seen in FIG. 2. The valve 14 has a housing that is made up of two parts. The first housing part in this embodiment is a portion of the end plate 12 so that hereafter, the reference numeral 12 denotes the first housing part which in this embodiment is part of the system or part of the source of beverage or other product. To that end, the first housing part 12 has a conical valve seat 15 which is directed upstream. Upstream from the valve seat 15, the first housing part 12 has a cylindrical bore 16, portions of which are also referred to herein as parallel guide surface means.

The sanitary dispensing valve 14 further includes a second housing part 17, also referred to herein as a detachable valve body, and which has a dispensing outlet 18 which communicates fluidly with the valve seat 15. The second housing part or detachable valve body 17 has a vertical axis bore 19 of circular cross section, the same being cylindrical in this embodiment.

Upstream from the valve seat 15 in the first housing part 12 there is disposed a valve 20 having a sealing face 21 shown in the open position, but which normally engages the valve seat 15. The valve 20 has a streamlined upstream surface 22 supporting guide means 23 which engage the parallel guide surface means 16. In this embodiment, the guide means 23 comprises a set of four fins each disposed so that its principal plane lies parallel to the direction of flow of product, thereby enabling product to flow through such guide means 23. As is explained later herein, a slight rotation is imparted to the valve 20, whereby a slight rotation is also imparted to the fins 23, which in turn impart slight rotation to the product just upstream of the valve, thereby tending to free up any clogging that might be taking place, such as due to freezing or agglomeration. The valve 20 further includes a stem 24 which extends through the valve seat 15 into the second housing part 17. The stem 24 has a slot or aperture 25 which extends transversely therethrough. In this embodiment, the stem 24 has a circular cross section and has its end adjacent to the slot or aperture 25 supported rotatably by the second housing part 17 primarily for reciprocation, but also for slight rotation. The aperture 25 is elongated as shown in FIG. 3 in a direction which is transverse to the direction of reciprocation. The valve 20 is reciprocated for initiating and for terminating product flow, and fluid pressure acts to assist in the closing and to assist in the maintenance of a fluid-tight relationship between the valve seat 15 and the sealing face 21. The slight rotary movement that the valve 20 has assists in breaking the valve open if there is any tendency for it to stick, and also assists in a wringing manner to establish a fluid-tight relationship at closing thereof.

In order to operate or reciprocate the valve 20, there is provided a valve actuator generally indicated at 26. The valve actuator includes a handle 27 having a knob 28, the handle 27 having a vertical bearing portion 29 disposed in the cylindrical bore 19 and having a complemental shape. Thus the bearing portion 29 is rotatable in the bore 19. The bore 19 is disposed above the valve stem 24 and the axis of the bore 19 is horizontally offset from the axis of the valve stem 24, as best in seen in FIG. 3.

There is a connection 30 provided between the actuator 26 and the valve 20, such connection here comprising a pin and slot connected between the bearing portion 29 and the stem 24. Thus there is a pin 31 which projects downwardly from the bearing portion 29 into the slot 25, the pin 31 being eccentric to the axis of the bore 19 as seen in both FIGS. 2 and 3.

An apertured retaining cap 32 is rotatably secured as by threads to the upper part of the second housing part or valve body 17 and the apertured cap retains the bearing portion 29 in the bore 19. The retaining cap 32 has a series of radially projecting knobs 33. One purpose of the knobs 33 is to enable manual securement and detachment of the retaining cap 32. A further purpose is explained hereafter. The retaining cap 32 can be manually unscrewed from the second housing part 17, thereby freeing the actuator 26, enabling it to be lifted out of the bore 19, thus disengaging the connection 30. The remaining cap remains trapped on the handle portion 27 of the actuator 26. Reattachment is of course effected by reversing these steps and rotating the cap 32 about the vertical axis of the bore 19.

Figure 2:
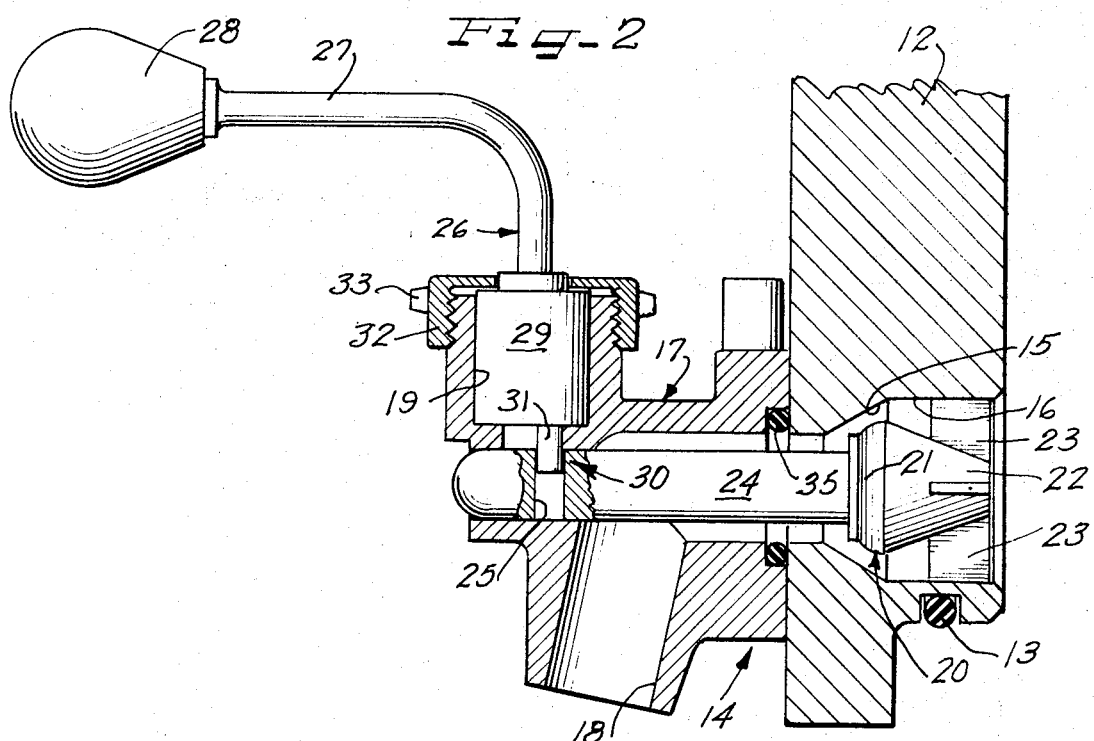
FIG. 2 is an enlarged cross-sectional side view thereof taken along line II—II in FIG. 1.

When the actuator 26 is rotated about the vertical axis of the bore 19, the pin 31 moves in an arc about the axis of the bore 19, but this axis is offset from the axis of the stem 24. Owing to its placement, the pin 31 has its primary movement in a front to rear direction so that it acts on the stem 24 within the slot 25 along the shortest direction of the slot 25. In doing so it rubs against the stem 24 with a certain amount of friction. The vertical extent of the pin 31, considering only that part which extends into the stem 24, is less than one-half the transverse dimension of the stem 24 and thus torque is applied by friction to the stem 24 to cause slight rotation thereof. Further, the geometry of the pin and slot connection shown and described is such that when the valve is substantially closed, the pin 31 is at its forward limit of travel, and very little rotational movement is permitted, while when the valve is open, the pin 31 is at its rearmost position as shown in FIG. 2, and under this condition, the valve can rotate for over 25°, namely it has a sort of "floating" connection. Nevertheless, no matter where the valve may be located from an angular standpoint, even neglecting friction, there is still some positive angular driving of the valve effected by the structure shown and described.

As shown in FIG. 2, a seal 35 encircles the axis of the valve seat 15 and is disposed between the first and second housing parts 12,17 to provide a static seal therebetween.

Means are provided for detachably holding or securing the housing parts 12,17 together. These parts 12,17 are normally held together but are manually releasable. For such purpose, the first housing part 12 is provided with a pair of mounting pins 36 which are screwed to the housing part 12 and which have a rounded distal end as best seen in FIG. 4. Each mounting pin 36 has a peripheral recess 37 which for convenience of manufacture and installation extends circumferentially, but which functions only at one side as shown in FIG. 4. Each mounting pin 36 projects into the second housing part 17 through lateral flange like portions thereof. Thus to assemble the housing parts together, the housing part 17 has a pair of apertures which receive the mounting pins 36 that thus move relatively into the apertures. To hold the same in position, there is provided for each mounting pin 36 a vertical locking pin 38 which extends vertically in the second housing part 17, there being a bore for each vertical pin 38 that intersects the bore in which the mounting pins 36 are disposed, as best seen in FIG. 4. The vertical locking pin is preferably provided with a frictional retainer 39 so that the pin will not fall out when the second housing part has been removed and is separately handled. Although the locking pins 38 could be removed axially to effect release of the mounting pins 36, it is preferable that the locking pins 38 be rotatable and be provided with a lateral recess 40 seen in cross section in FIGS. 4 and 5 and in perspective in FIG. 3. When the lateral recess 40 is rotated into alignment with the peripheral recess 37 as shown in FIG. 5, the locking pin 38 is in effect removed so that the mounting pin 36 may pass relatively for either assembly or disassembly. However, when the vertical locking pin 38 is rotated from the position shown in FIG. 5 to that shown in FIG. 4, a non-recessed portion of the pin 38 enters the recess 37 to preclude any axial movement. Some camming action also takes place during rotation of the locking pins 38 so that if the second housing part or valve body 17 is not fully seated, such seating will be augmented.

In order that the user may know when the recess 40 is aligned with the recess 37, each of the locking pins 38 is provided with a radially projecting stop surface 41 which is rotatable until it engages an abutment 42 on the second housing part 17. At the point of such engagement, the recess 40 is precisely aligned for release of the mounting pin 36.

To effect such rotation, each locking pin 38 is provided with a radially projecting arm 43 which thus is movable about a vertical axis. The radially projecting arms 43 have a further function in that they cooperate with the knobs 33. They are substantially at the same elevation. When the arms 43 are disposed in the locked position as shown in FIGS. 1, 2 and 3, the apertured cap 32 can be readily rotated, thereby assuring that the valve actuator 26 will be removed before the mounting pins 36 are unlocked. In the event that an attempt is made to first rotate the locking pins 38, the arms 43 will not be able to move to the unlocked position, but instead will hit one of the knobs 33. In this manner, the pressure in the system is certain to seat the valve 20 before the second housing part 17 can become unlocked.

It is evident that when the valve body 17 has been removed, the valve stem 24 is accessible for unauthorized tampering or valve opening. To preclude this possibility, there is provided a substitute second housing part 50 which receives the valve stem 24 and which has a flange 51 that is apertured to receive the mounting pins 36. The substitute second housing part 50 is of such length and configuration as to fill the space between the first housing part 12 and the aperture 25 in the stem 24, and in this embodiment, a keyed lock of conventional construction is passed through the aperture 25. Thus after the valve body 17 has been removed and the valve stem sanitized, unauthorized access can be prevented. Further, even if no sanitizing is necessary, by the replacement of the second housing part 17 with the substitute second housing part 50, along with the lock, the pressurized system is locked up.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A sanitary dispensing valve, comprising:
   a. a housing having two parts, the first of the parts having a valve seat directed upstream and being adapted to be secured to and communicate fluidly with a source of product to be dispensed and the second of the parts having a dispensing outlet communicating with said valve seat;
   b. a seal between said housing parts encircling the axis of said valve seat;
   c. manually releasable holding means normally holding said housing parts together, including
      1. at least one mounting pin secured to said first housing part and having a peripheral recess, and projecting horizontally into said second housing part, and
      2. a manually movable locking pin projecting vertically in said second housing part through said peripheral recess;
   d. a valve having a sealing face normally engaging said valve seat in said first housing part;
   e. a valve actuator movably supported on said second housing part and having a connection with said valve for effecting reciprocation of said valve; and
   f. said valve actuator and said second housing part being respectively detachable from said valve and said first housing part without disengaging said sealing face from said valve seat.

2. A sanitary dispensing valve according to claim 1 in which said locking pin is rotatable, and has a lateral recess rotatable into alignment with said peripheral recess through which said mounting pin may pass relatively.

3. A sanitary dispensing valve according to claim 2 having a radially projecting stop surface on said locking pin engageable with an abutment on said second housing part when said lateral recess is disposed to enable said mounting pin to pass relatively.

4. A sanitary dispensing valve according to claim 1 including a frictional retainer acting between said locking pin and said second housing part.

5. A sanitary dispensing valve, comprising:
   a. a housing having two parts, the first of the parts having a valve seat directed upstream and being adapted to be secured to and communicate fluidly with a source of product to be dispensed and the second of the parts having a dispensing outlet communicating with said valve seat;
   b. a seal between said housing parts encircling the axis of said valve seat;
   c. manually releasable holding means normally holding said housing parts together and including at least one manually movable vertical locking pin having a radially projecting arm, said arm being normally in a locking position and movable to an unlocked position;
   d. a valve having a sealing face normally engaging said valve seat in said first housing part;
   e. a valve actuator movably supported on said second housing part and having a connection with said valve for effecting reciprocation of said valve, said valve actuator including a retaining cap removably secured to said second housing part, and rotatable about a vertical axis, said retaining cap having a series of radially projecting knobs, disposed such that one of said knobs can block movement of said arm to said unlocked position, whereby said holding means can be released only when said retaining cap has been removed; and
   f. said valve actuator and said second housing part being respectively detachable from said valve and said first housing part without disengaging said sealing face from said valve seat.

* * * * *